United States Patent [19]
Pollitt et al.

[11] 3,883,361
[45] May 13, 1975

[54] PORTLAND CEMENTS

[75] Inventors: Harry Wilfred Wallace Pollitt, Sevenoaks; Arthur William Brown, London, both of England

[73] Assignee: The Associated Portland Cement Manufacturers Limited, London, England

[22] Filed: Oct. 4, 1973

[21] Appl. No.: 403,427

[30] Foreign Application Priority Data
Oct. 11, 1972   United Kingdom............... 46875/72

[52] U.S. Cl. .................... 106/89; 106/100; 106/103
[51] Int. Cl. .............................................. C04b 7/02
[58] Field of Search...................... 106/89, 100, 103

[56] References Cited
UNITED STATES PATENTS

| | | | |
|---|---|---|---|
| 3,155,526 | 11/1964 | Klein.................................... | 106/89 |
| 3,251,701 | 5/1966 | Klein.................................... | 106/100 |
| 3,711,306 | 1/1973 | Kogan et al......................... | 106/100 |

*Primary Examiner*—J. Poer
*Attorney, Agent, or Firm*—Baldwin, Wight & Brown

[57] ABSTRACT

A cement of the Portland type comprising at least a proportion of a clinker ground to a specific surface of 250–550 $M^2/Kg$ and having a microstructure predominantly comprising alite crystals containing globular inclusions of free lime, the free lime content of the clinker being at least 2% by weight and predominantly formed by the globular inclusions in the alite crystals.

10 Claims, No Drawings

PORTLAND CEMENTS

This invention relates to cements of the Portland type, and more particularly to cements of this type which expand in the course of hydration.

Such cements have potential utility in a number of applications, one particular example being in screeds for paving. By incorporating in a concrete a cement which expands on hydration it is the intention that the expansive stresses compensate for those stresses developed during drying which normally cause shrinkage, resulting in the production of a non-shrinking concrete. Alternatively, a net expansion produced in the concrete may be restrained by reinforcing members so as to provide a self stressing effect.

However, with known types of hydraulic cement which expand upon hydration, it has not been possible adequately to control the expansion. Expansion occurring during the early stages of hydration will produce plastic deformation of a concrete incorporating the cement, whilst expansion occurring in the later stages of hydration may produce micro-cracking if the expansive stresses exceed the tensile strength of the structure with the result that the overall compressive strength of the structure is reduced.

The object of the present invention is to provide a cement in which the degree of expansion produced is controllable, and in which expansion occurs progressively during hydration.

According to the invention, a cement of the Portland type having expansive properties comprises at least a proportion of a clinker ground to a specific surface of 250–550 $M^2/Kg$ having a microstructure predominantly comprising alite crystals containing globular inclusions of free lime, the free lime content of the clinker being at least 2% by weight and predominantly occurring as the globular inclusions in the alite crystals.

The invention extends to a method of producing such a cement comprising forming a clinker using as a raw material a mixture of argillaceous and calcareous materials proportioned to favour the formation on firing of $C_3S$ together with free lime, at least 2% of the calcareous material being provided in the form of calcium sulphate.

It is known that the hydration of lime (calcium oxide) is accompanied by a marked expansion during the hydration process, but in practice it has been difficult to control this expansion and furthermore the hydration process is more rapid than that of other components of conventional Portland cements, with the result that the expansion mainly occurs during the earlier portion of the hydration period of a lime/Portland cement mixture resulting in the difficulties outlined above. By providing, as required by the present invention, a cement of which at least a portion is ground from a special clinker having a micro structure in which globules of free lime are encapsulated within alite crystals, the lime content of the cement will be made available for hydration gradually as the alite within which the lime is encapsulated is itself hydrated. Thus the hydration of the lime content of the cement can be kept in step with the hydration of the alite content of the cement.

Control of the expansive properties of the cement can be achieved by varying the free lime content of the special clinker by varying the composition of the raw material mixture and/or the firing technique used.

Control of the expansive properties of the cement can be further controlled by intergrinding or blending after grinding the special clinker in different proportions with conventional Portland cement clinker, whilst the rate of release of the free lime content can be controlled by varying the specific surface to which the special clinker is ground. In addition of course the lime content of the special clinker can itself be varied over a wide range.

In order to obtain a clinker having the desired micro structure, a blend of raw materials is prepared consisting of argillaceous and calcareous material in such a proportion as to give a lime saturation factor preferably in the range 0.90 – 1.30, sufficient to ensure the presence of at least 2% by weight of free lime in the fired clinker, and the calcareous material including at least 2% by weight of calcium sulphate. On firing, the calcium sulphate forms a highly mobile flux which promotes the combination of the argillaceous and calcareous components of the raw material mix to form calcium aluminates and calcium silicates especially $C_3S$. In the final clinker, the free lime predominantly occurs as globular inclusions within crystals of alite. The most preferred range of free lime content is 3%–12% by weight.

Even higher free lime contents, up to about 50% by weight, are attainable in the fired clinker by suitable choice of proportions of raw materials, but free lime contents up to 20% are those most likely to be of practical usefulness.

The calcium sulphate used may be anhydrite or any hydrate of calcium sulphate, and will form part of the calcareous material in the raw material mix.

The total percentage of free lime in the special clinker, as detected by the normal extraction method used for assessing free lime in ordinary Portland cements, preferably lies between 2% and 20% and, more preferably, 3% and 12% by weight. It is of course well known that free lime does occur in Portland cements, but it is normally considered an undesirable constituent, and hence the free lime content is kept far below the level now proposed; moreover, the flexing effect of the calcium sulphate content of the raw material mix promotes the incidence of the free lime predominantly as inclusions in the alite crystal content of the clinker.

The specific surface to which the clinker is ground will control to some degree the proportion of the free lime inclusions in the alite crystals which are exposed by the grinding process, and will thus influence the initial rate of expansion of the cement, thus providing yet a further means of controlling its expansive properties. Again, some control of the properties of the resulting cement, where it comprises a mixture of the special clinker and a conventional Portland cement clinker, may be achieved by separate grinding of the constituents to different specific surfaces followed by blending, or by intergrinding. The free lime content of the final cement, whether formed solely from the special clinker or blended with ordinary Portland cement, is usually in the range 4%–6% by weight where the object is to compensate for shrinkage in concretes in which the cement is to be used. Where a net expansion of the concrete is required, a somewhat higher free lime content will be appropriate.

The invention is illustrated by the following Examples, in which the following data is applicable in each case.

RAW MATERIALS

Throughout the examples the following raw materials, ground to 5% retained on a BS 90 μm sieve, were utilized, with principal constituents as follows.

|  | A. Chalk % | B. Sand % | C. Clay % | D. Gypsum % | E. Iron Oxide % |
|---|---|---|---|---|---|
| $SiO_2$ | 1.2 | 99.3 | 41.9 | 0.2 | 1.1 |
| $Al_2O_3$ | 0.4 | 0.3 | 11.5 | 0.3 | 0.6 |
| $Fe_2O_3$ | 0.2 | 0.1 | 3.8 | 0.01 | 96.9 |
| CaO | 54.8 | 0.1 | 19.5 | 32.0 | 0.5 |
| $SO_3$ | 0.1 | 0.01 | 0.1 | 46.5 | 0.02 |

FORMULATION

Mixes were proportioned in terms of the following parameters defined as:
 i. Lime saturation factor (L.S.F.) = $[CaO/2.8 SiO_2+1.2 Al_2O_3+0.65 Fe_2O_3]$
 ii. Silica ratio (S/R) = $[SiO_2/Al_2O_3 + Fe_2O_3]$
 iii. Alumina ratio (A/F) = $[Al_2O_3/Fe_2O_3]$
 iv. Percentage of total lime orginating from a calcium suplate source (P).

METHOD oF PREPARATION OF CEMENTS

The raw material specified above, proportioned to provide required values of the four parameters specified above, were blended with water and pressed into cakes which were subsequently dried.

The cakes were sintered at 1,525°C for 30 minutes in an oil fired furnace to give clinkers of the microstructure characteristic of the invention.

The clinkers were ground, after addition of sufficient gypsum to give a final cement $SO_3$ level of 2–3%, to a required specific surface area, as measured by the air permeability method according to B.S.12 (1971).

TESTING PROCEDURE

Cements prepared as above were mixed with standard sand in a 1:1 weight ratio and gauged with water to give a water/cement ratio of 0.4. The mortar was cast in 6 × 1 × 1 cm moulds with fiducial studs cast in pairs approximately 50 mm apart on two opposite faces of the resulting prism.

After 16 hours curing in an atmosphere of 100% relative humidity (R.H.), the cast prisms were demoulded and measured with a dial gauge, thereafter being stored under water.

After 14 days curing the prisms were removed from water and air dried at ambient temperature and humidity over a further period of 14 days and measured, giving a final value of net length change from the demoulded length.

This test procedure when applied to ordinary Portland cements usually gives net linear shrinkages between 0.12% and 0.20%.

EXAMPLE 1

The raw materials listed above were blended in the following proportions:
 73.5% A, 13.5% B, 2.0% C, 10.3% D, 0.7% E
to form a raw feed with the mix parameters as defined above of:
 LSF = 1.01, S/R = 10.0, A/F = 0.6, P = 7.5.

The mix was sintered as described above to give a clinker with a free lime content of 4.8% and an oxide analysis:
 $SiO_2$ 24.5%, $Al_2O_3$ 0.9%, $Fe_2O_3$ 1.5%, CaO 71.5% and $SO_3$ 0.7%.

Examination of the microstructure of the clinker showed that the free lime content occurred predominantly as globular inclusions within alite crystals.

The following cements were prepared from this special clinker.

a. The clinker was ground with gypsum to a specific surface of 330 $M^2 Kg^{-1}$. The resultant cement was tested as detailed above and gave a net linear expansion of 0.01%. In this way, adequate shrinkage compensation was achieved when compared with a typical drying shrinkage for OPC of approximately 0.12 to 0.20% under a similar test procedure.
 100 mm concrete cube strengths, determined according to B.S.12 (1971) at 3, 7 and 28 days, gave 18, 27 and 40 $Nmm^{-2}$ respectively.
 b. The clinker was ground with gypsum to a specific surface of 430 $M^2Kg^{-1}$. The resultant cement was tested as described above and gave a net linear contraction of 0.04%.
 c. The clinker was ground with gypsum to a specific surface of 280 $M^2Kg^{-1}$. The resultant cement was tested as described above and gave a net linear expansion of 0.10%, i.e., higher than would be necessary for shrinkage compensation.

EXAMPLE 2

Further samples of the cement tested in Example 1(a), were subjected to the following more comprehensive test procedure:

a. The cement was mixed with Curtis sand in a 1:1 ratio and gauged with water to give a water/cement ratio of 0.4. The mortar was cast in 11 inches × 1 inch × 1 inch moulds with fiducial studs located at each end.
 The curing procedure already described was followed and a net linear contraction of 0.01% resulted.
 b. The cement was mixed with a continuously graded sand/aggregate of maximum size 3 inch/16 in a 1:4 ratio and gauged to a water/cement ratio of 0.46. The concrete was cast in 11 inches × 1 inch × 1 inch moulds with fiducial studs located at each end. The curing procedure described was followed and a net linear expansion of 0.015% resulted.
 c. The cement was mixed with a continuously graded sand/aggregate of maximum size 3inch/16 in a 1:4 ratio and gauged to a water/cement ratio of 0.46. The concrete was cast in 3 inch × 3 inch × 9 inch moulds with fiducial studs located at each end. The curing procedure described above was adopted with, however, an extended air drying period of 28 days for the larger size of the resulting prism. A net linear expansion of 0.01% resulted.

EXAMPLE 3

The raw materials listed above were blended in the following proportions:
 72.3% A, 8.1% B, 12.7% C, 6.9% D
to form a raw feed with the mix parameters as defined above of:
 LSF = 1.05, S/R = 6.0, A/F = 3.0, P = 5.0.

The mix was sintered as described to give a clinker with a free lime content of 5.0% and an oxide analysis: SiO$_2$ 22.9%, Al$_2$O$_3$ 2.9%, Fe$_2$O$_3$ 1.0%, CaO 71.5% and SO$_3$ 0.4%.

Examination of the microstructure of the clinker showed that the free lime occurred predominantly as globular inclusions in alite crystals.

Samples of this special clinker were ground with gypsum to a specific surface of 330 M$^2$ Kg$^{-1}$. The resultant cement was tested as described above and gave a net linear expansion of 0.03%.

EXAMPLE 4

The raw materials listed above were blended in the following proportions:
72.8% A, 14.0% B, 2.2% C, 10.2% D, 0.8% E
to form a raw feed with the mix parameters as defined above of:
LSF = 0.96, S/R = 10.0, A/F = 0.6, P = 7.5.

The mix was sintered as described to give a clinker with a free lime content of 4.7%, predominantly in the form of globular inclusions within alite crystals, and an oxide analysis:
SiO$_2$ 25.3%, Al$_2$O$_3$ 1.0%, Fe$_2$O$_3$ 1.7% CaO 70.3% and SO$_3$ 0.5%.

Samples of this special clinker were ground with gypsum to a specific surface of 330 M$^2$ Kg$^{-1}$. The resultant cement was tested as described above and gave a net linear expansion of 0.02%.

EXAMPLE 5

The raw materials listed above were blended in the following proportions:
76.2% A, 9.2% B, 6.2% C, 7.0% D, 1.4% E, to form a raw feed with the mix parameters as defined above of:
LSF = 1.20, S/R = 4.5, A/F = 0.6, P = 5.0.

The mix was sintered as detailed in III to give a clinker with a free lime content of 10.3% and an oxide analysis:
SiO$_2$ 20.5%, Al$_2$O$_3$ 1.7%, Fe$_2$O$_3$ 2.8%, CaO 73.5% and SO$_3$ 0.3%.

The following cements were prepared from this special clinker:

a. The clinker was ground with gypsum to a specific surface of 330 M$^2$ Kg$^{-1}$. The resultant cement was tested as described above and gave a net linear expansion of 2.15%.

b. The clinker was ground with gypsum to a specific surface of 330 M$^2$Kg$^{-1}$ and blended with a first type of ordinary Portland cement clinker ground to the sampe specific surface, with a similar total cement SO$_3$ content; the weight ratio of the two cements was 40:60. The resultant cement was tested as described above and gave no change in length, i.e., precise shrinkage compensation.

c. The clinker was ground with gypsum to a specific surface of 330 M$^2$ Kg$^{-1}$ and blended with a second type of ordinary Portland cement clinker ground separately to the same specific surface, with a similar total cement SO$_3$ content; the weight ratio of the two cements was 50:50. The resultant cement was tested as described above and gave a net linear expansion of 0.05%.

EXAMPLE 6

The raw materials listed in I were blended in the following proportions:
72.2% A, 14.1% B and 13.7% D
to form a raw feed in which:
LSF = 1.05, P = 10.0.

The mix was sintered as described above to give a clinker with a free lime content of 4.0% predominantly in the form of globular inclusions within alite crystals, and having an oxide analysis:
SiO$_2$ 24.8%, Al$_2$O$_3$ 0.6%, Fe$_2$O$_3$ 0.3%, CaO 73.0% and SO$_3$ 1.1%.

This gave a S/R = 27 and an A/F = 2.1 in the final clinker.

Samples of this clinker were ground with gypsum to a specific surface of 330 M$^2$ Kg$^{-1}$. The resultant cement was tested as detailed above and gave a net linear expansion of 0.03%.

EXAMPLE 7

The raw materials listed above were blended in the following proportions:
73.5% A, 13.5% B, 2.0% C, 10.3% D, 0.7% E
to form a raw feed with mix parameters of:
LSF = 1.01, S/R = 10.0, A/F = 0.6, P = 7.5.

The mix was sintered as described above to give a clinker with a free lime content of 5.7%, predominantly in the form of globular inclusions within alite crystals, and an oxide analysis:
SiO$_2$ 24.6% Al$_2$O$_3$ 0.9%, Fe$_2$O$_3$ 1.5%, CaO 71.9% and SO$_3$ 0.2%.

The following cement was prepared from this clinker.

The clinker was ground with gypsum to a specific surface of 330 M$^2$ Kg$^{-1}$. The resultant cement was mixed with a continuously graded sand/aggregate of maximum size 3 inch/16 in a 1:4 ratio and gauged to a water/cement ratio of 0.46. The concrete was cast in a 3 inch × 3 inch × 9 inch mould, cured for 16 hours in an atmosphere of 100% R.H. and demoulded.

The prism so formed was subjected to a uniaxial restraint applied exclusively along the 9 inch axis during curing for a period of 14 days under water. On drying in air for a further period of 28 days the net linear expansion was 0.029%.

We claim:

1. An expansive cement of the Portland type comprising a clinker ground to a specific surface of 250 – 550m$^2$/kg and composed predominantly of alite crystals with at least 2 percent by weight based on the clinker of free lime the major proportion of which is the form of globular inclusions encapsulated within individual alite crystals.

2. A cement composition comprising a mixture of expansive cement as defined in claim 1 and ordinary Portland cement.

3. A cement according to claim 1, wherein the clinker has a free lime content of up to 20% by weight.

4. A cement according to claim 3, wherein the clinker has a free lime content of 3%–12% by weight.

5. A cement according to claim 4, wherein the free lime content of the cement is 4%–6% by weight.

6. An expansive cement of the Portland type comprising an intimate mixture of (A) at least 40 parts by weight of a clinker ground to a specific surface of 250 – 550m$^2$/kg and composed predominantly of alite crystals with at least 2 percent by weight based on the clinker of free lime the major proportion of the free lime being encapsulated inside the alite crystals as globular inclusions therein, with (B) 60 parts by weight of an ordinary Portland cement.

7. A method of producing a Portland type cement having expansive properties, comprising: forming a mixture of (A) argillaceous material and (B) calcareous material at least 2 percent by weight of which is calcium sulphate, in proportions of (A) and (B) favoring the formation on firing of $C_3S$ with at least 2 percent of free lime; firing the mixture until a clinker is formed having a microstructure composed predominantly of alite crystals encapsulating the major proportion of said free lime as globular inclusions within individual alite crystals; and grinding the clinker to a specific surface of $250 - 550 m^2/kg$.

8. A method according to claim 7 wherein at least 40 parts by weight of said clinker are interground with 60 parts by weight of ordinary Portland cement clinker.

9. A method according to claim 7, wherein at least 40 parts by weight of said clinker after grinding are blended with 60 parts by weight of ordinary Portland cement.

10. A method according to claim 7, wherein the lime saturation factor of the raw material mix is in the range $0.90 - 1.30$.

* * * * *